(12) United States Patent
Assayag et al.

(10) Patent No.: US 7,388,601 B2
(45) Date of Patent: Jun. 17, 2008

(54) SYSTEM AND METHOD FOR THE AUTOMATED, REMOTE DIAGNOSTIC OF THE OPERATION OF A DIGITAL VIDEO RECORDING NETWORK

(75) Inventors: Pen Pross Assayag, Montreal (CA); Marc Ducharme, Blainville (CA)

(73) Assignee: Inter-cité Vidéo Inc., Quebec (CA)

( * ) Notice: Subject to any disclaimer, the term of this patent is extended or adjusted under 35 U.S.C. 154(b) by 905 days.

(21) Appl. No.: 10/880,174

(22) Filed: Jun. 29, 2004

(65) Prior Publication Data

US 2005/0183128 A1 Aug. 18, 2005

Related U.S. Application Data

(60) Provisional application No. 60/545,274, filed on Feb. 18, 2004.

(51) Int. Cl.
*H04N 17/00* (2006.01)
*H04N 17/06* (2006.01)

(52) U.S. Cl. ............... 348/180; 348/192; 348/187; 348/189; 386/46

(58) Field of Classification Search ........... 348/180, 348/181, 192, 187, 189, 153, 159; 709/224, 709/200, 221; 714/25, 46, 47, 4; 386/46, 386/52; 725/105, 107; 324/158.1
See application file for complete search history.

(56) References Cited

U.S. PATENT DOCUMENTS

| | | | | |
|---|---|---|---|---|
| 4,285,004 A | 8/1981 | Morrison et al. | ............... | 358/10 |
| 4,544,952 A | 10/1985 | Pham van Cang | ............ | 358/210 |
| 4,566,036 A | 1/1986 | Kadosawa | ................... | 358/210 |
| 4,608,593 A | 8/1986 | Miyaji et al. | .................. | 358/10 |
| 4,609,939 A | 9/1986 | Kozawa et al. | ............. | 358/101 |
| 4,774,570 A | 9/1988 | Araki | ........................ | 358/108 |
| 4,777,526 A | 10/1988 | Saitoh et al. | ............... | 358/108 |
| 4,901,147 A | 2/1990 | Tajima | ....................... | 358/139 |
| 4,945,417 A | 7/1990 | Elberbaum | ................... | 358/210 |
| 5,055,928 A | 10/1991 | Klingelhofer | ............... | 358/139 |
| 5,206,732 A | 4/1993 | Hudson | ...................... | 358/209 |
| 5,274,446 A | 12/1993 | Ashida | ........................ | 358/139 |
| 5,568,183 A | 10/1996 | Cortjens et al. | .............. | 348/15 |
| 5,778,008 A | 7/1998 | Shimizu et al. | ............ | 371/25.1 |
| 6,208,379 B1 | 3/2001 | Oya et al. | .................... | 348/213 |
| 6,385,739 B1 | 5/2002 | Barton et al. | ................. | 714/25 |
| 6,667,764 B1 | 12/2003 | Wakiyama et al. | ......... | 348/211 |
| 6,760,916 B2 * | 7/2004 | Holtz et al. | ................... | 725/34 |
| 6,859,609 B1 * | 2/2005 | Watkins | ....................... | 386/46 |
| 7,154,533 B2 * | 12/2006 | Sheldon et al. | ............. | 348/192 |
| 7,260,597 B1 * | 8/2007 | Hofrichter et al. | .......... | 709/200 |
| 7,299,277 B1 * | 11/2007 | Moran et al. | ............... | 709/224 |

(Continued)

*Primary Examiner*—David Ometz
*Assistant Examiner*—Jean W. Désir
(74) *Attorney, Agent, or Firm*—Merchant & Gould P.C.

(57) ABSTRACT

A method and a system for automatically performing diagnostics of various operational parameters of digital video recorders, cameras, peripheral and associated components encompassing a video system, are provided. Script files are provided including diagnostic instructions, which are executed according to a schedule. The diagnostics for example include catalogue size verification, live working check for each camera, camera analysis of the image brightness and camera movement verification. Automated repair of the cameras is also possible. Preferably, the instructions are executed through an interface remotely interacting with the user control software of the cameras.

58 Claims, 15 Drawing Sheets

U.S. PATENT DOCUMENTS

| | | |
|---|---|---|
| 7,308,492 B2 * | 12/2007 | Konopka et al. ............ 709/221 |
| 2002/0171741 A1 | 11/2002 | Tonkin et al. ............ 348/211.3 |
| 2003/0081125 A1 | 5/2003 | Sheldon et al. ............. 348/180 |
| 2003/0163765 A1 | 8/2003 | Eckardt et al. ................ 714/36 |
| 2003/0206232 A1 | 11/2003 | Suzuki et al. ............ 348/211.1 |

* cited by examiner

SYSTEM AND METHOD FOR THE AUTOMATED, REMOTE DIAGNOSTIC OF THE OPERATION OF A DIGITAL VIDEO RECORDING NETWORK

This application claims the benefit of Provisional Application No. 60/545,274, filed Feb. 18, 2004, which is incorporated by reference herein in its entirety.

FIELD OF THE INVENTION

The present invention relates to digital video networks, and more particularly concerns a system and a method for automatically performing diagnostics of various operational parameters of digital video recorders, cameras, peripheral and associated components encompassing a video system. There is also advantageously provided means for executing repairs/resets of defective devices and for reporting on the operation thereof, all automatically from a remote central location.

BACKGROUND OF THE INVENTION

The influx of digital video recorders, either completely digital or hybrids, unto the marketplace has compounded the issues of the performance of video networks by giving the end users a false sense of security afforded by the remote connectivity nature of their machine's operation.

This is clearly indicated by the fact that those digital video recorders basically replace analog video recorders and are component, not system based solutions. As the wording would imply, a component-based solution rarely, if ever, looks at the whole of the components around its borders to properly integrate and produce results. A single component cannot control the quality and integrity of the devices connected to it. Stated simply, once the digital video recorder is installed, nothing will let the users know of current failures or give them the ability to automatically verify performance across their network of operations. In some cases, failures can only be discovered once an end user manually calls the remote site and requests an error file download. Another known method is to have the remote machine call into a central area once a failure is detected, such as a loss of video, which of course is only possible if the CPU, modems, and software are still able to perform such a task and if no generalized failure causes all machines to simultaneously connect to the central site and crash the communication links or any authenticating process.

Current digital video recorder solutions are not able to periodically and automatically send crucial pre-programmed centrally directed information so as to continuously adjust various functions, to elevate performance and to offer greater peace of mind. This commonly accepted operational philosophy actually renders the end user blind as to the performance levels of the multitude of recorders and associated devices over his network. Furthermore, the operator is unable to detect even minor deviation issues which can greatly affect image quality and output precision. These deviations can for example include a defaced camera where the image rendered is unacceptable, basic video data having color burst or missing or incorrect synch. The basic "video loss" detection methods employed in the industry are unable to react to such variations. This has a great impact on criminal case to be resolved in video security systems and also applies to video systems used for process control, automation and video monitoring as the image output depends solely on the healthy functionality of the video system, with no concrete and quantifiable verification of operation. The output precision and accuracy is a major factor in rendering identifiable images which can be used for case prosecution or any post analysis work.

The manual option of locating errors is not practical or even possible when a large number of machines must be verified. No known current technology can automatically detect, verify, align/adjust parameters and/or alert via multiple methods and levels. In addition, no prior art digital video recorder or system can report the complete sequence for evaluation or analysis regardless of the make of digital video recorder in use.

Some forms of monitoring or diagnostic of camera networks in general are known in the prior art. For example, published US patent application no. U.S. 2003/0081125 A1 (SHELDON et al.), concerns a system and method for monitoring and diagnosis of a video network's performance. The invention is particularly directed to a video conferencing system and provides a diagnosis node, ensuring proper transmission of video data from each device. It does not, however, address the question of proper working of the video devices of the network. U.S. Pat. No. 4,774,570 (ARAKI) concerns a system for processing video signals for detecting changes in video data. It belongs to the field of security monitoring systems including a network of cameras. An automatic analysis of the image recorded by the cameras is made to detect a change therein and therefore identify activity in the field of vision of the camera. Again, however, this invention is not related to diagnosis of the camera's proper functioning. U.S. Pat. No. 4,566,036 (KADOSAWA), U.S. Pat. No. 4,609,939 (KOZAWA et al.), U.S. Pat. No. 5,568,183 (CORTJENS et al.), U.S. Pat. No. 6,208,379 (OYA et al.) and US published patent applications nos. U.S. 2002/0171741 A1 (TONKIN et al.) and U.S. 2003/0206232 A1 (SUZUKI et al.), all relate to the positioning and control of cameras in a video network system.

None of the documents above provides for the diagnosis of components of a digital video recording network such as cameras, digital video recorders and peripheral devices, and for an automatic checking of their proper functioning. Such concepts are known for single cameras, such as taught by U.S. Pat. No. 5,274,446 (ASHIDA). ASHIDA provides a transmission apparatus with self-diagnostic capabilities. It is more particularly directed to television conference systems. It provides a camera apparatus which is not only capable of self diagnosis, but provides such information automatically and is also capable of recovery for a detected flaw if it occurs. Its working is based on image comparison between video signals acquired at different times. It does not however seem to mention the integration of such a camera in a digital video network. Similarly, U.S. Pat. No. 4,544,952 (PHAM VAN CANG), U.S. Pat. No. 4,608,593 (MIYAJI et al.), U.S. Pat. No. 4,901,147 (TAJIMA), U.S. Pat. No. 5,055,928 (KLINGELHOFER) and U.S. Pat. No. 5,778,008 (SHIMIZU et al.), all concern some form of diagnosis of a single camera device. However, these documents fail to teach how such diagnostic capabilities could apply in the context of a network of cameras or video recorders and associated devices.

In view of the above, there is therefore a need for a manner of providing automatic diagnostics and repair of digital video systems over a network which is practical and can be used for networks having a large number of cameras.

OBJECTS AND SUMMARY OF THE INVENTION

It is an object of the present invention to provide a practical system and method which automatically and remotely verifies and analyzes operating parameters related to the proper functioning of digital video recording systems, their cameras and devices of a video network.

It is preferable object of the invention for such a system which also, when required, automatically performs repairs to malfunctioning cameras when possible.

It is another preferable object to provide such as system or method which is easily applicable to networks having a large number of remote stations and cameras.

In accordance with a first aspect of the invention, the present invention therefore provides a method for automatically performing diagnostics of a digital video recording network which includes a plurality of remote stations each having a plurality of video system components. The method includes the steps of:

a) defining a plurality of scripts files each containing diagnostic instructions for performing a diagnostic of at least one of the video system components of a corresponding one of the remote stations;

b) defining a schedule assigning an execution time for each of these scripts;

c) monitoring time with reference to the schedule; and d) upon reaching one of the execution times:
   i. opening the corresponding script file;
   ii. establishing communication with the corresponding remote station;
   iii. remotely executing the diagnostic instructions in the script file; and
   iv. returning to step c).

In accordance with a second aspect of the invention, there is also provided a system for automatically performing diagnostics of a digital video recording network. The video recording network includes a plurality of remote stations each having a digital video recording unit connected to a plurality of video system components.

The system first includes a central server provided with a central application, this central application including a plurality of scripts files each containing diagnostic instructions for performing a diagnostic of at least one of the video system components of a corresponding remote station. A schedule assigning an execution time for each of these scripts and time monitoring means for monitoring time with reference to this schedule are also part of this central application.

The system further includes communication means for putting the server in communication with the digital video recording unit of a corresponding remote station at each execution time, and transmit the corresponding diagnostic instructions from the central server to this digital video recording unit.

Advantageously, the present invention promotes efficiency, reliability and monitoring of remote digital video recorder units or video systems via advanced diagnostics and reporting features, and through self-healing capabilities not previously employed in prior art. This is preferably achieved by an adjunct to video security and control systems, where a process is used to automatically and remotely verify, analyze a multitude of operating parameters and when required, automatically perform repairs to the defective or out of range areas. The results of those actions are then further evaluated and consequent alerting is triggered and logged should any specification not align into specification.

The remote piloting is a method to further enhance system functionality by periodically and automatically remotely adjust specific operating values to reflect the original system design specifications, and align the capture/record sites with the guidelines of the end users architecture philosophy.

Both these features are unique in the fact that current digital video security systems in use do not possess the ability to automatically and efficiently detect, mitigate and resolve common failures.

The present invention may be applied to numerous types of digital video recorders, either proprietary or not. It may advantageously be integrated to the DigiBank (trademark) video security and control system, but could equally be added to any new or pre-existing digital video recording network. In its preferred embodiments the present invention has the advantage of requiring very little software development and integration. This allows for a rapid and efficient interfacing to existing devices in the field, even for those which do not posses any remote diagnostics abilities.

This generic approach to taking control of any digital video recorder has never been employed previously where traditionally such features and options were only limited to manufacturer-specific models.

Other features and advantages of the present invention will be better understood upon reading of preferred embodiments thereof with reference to the appended drawings.

DESCRIPTION OF PREFERRED EMBODIMENTS OF THE INVENTION

In accordance with a preferred embodiment of the invention, there is provided a system and a method for automatically performing diagnostics of a digital video recording network. It is a useful feature of the invention that it may be used with any digital video recording network which includes components from any company, or even of mixed origins, but the invention may advantageously be combined with, without being limited to, the DigiBank™ video security system. Digibank™ is a dynamic digital recording system through which each site is viewed through playback software. Among other functions, it provides images on demand from different capture devices and allows setting the recorder time, frame rates, video, alarm data input parameters and other important operating sequences. For more information on this system, reference can be made to U.S. patent application Ser. No. 10/167,854 filed on Jun. 11, 2002.

Figure 1:
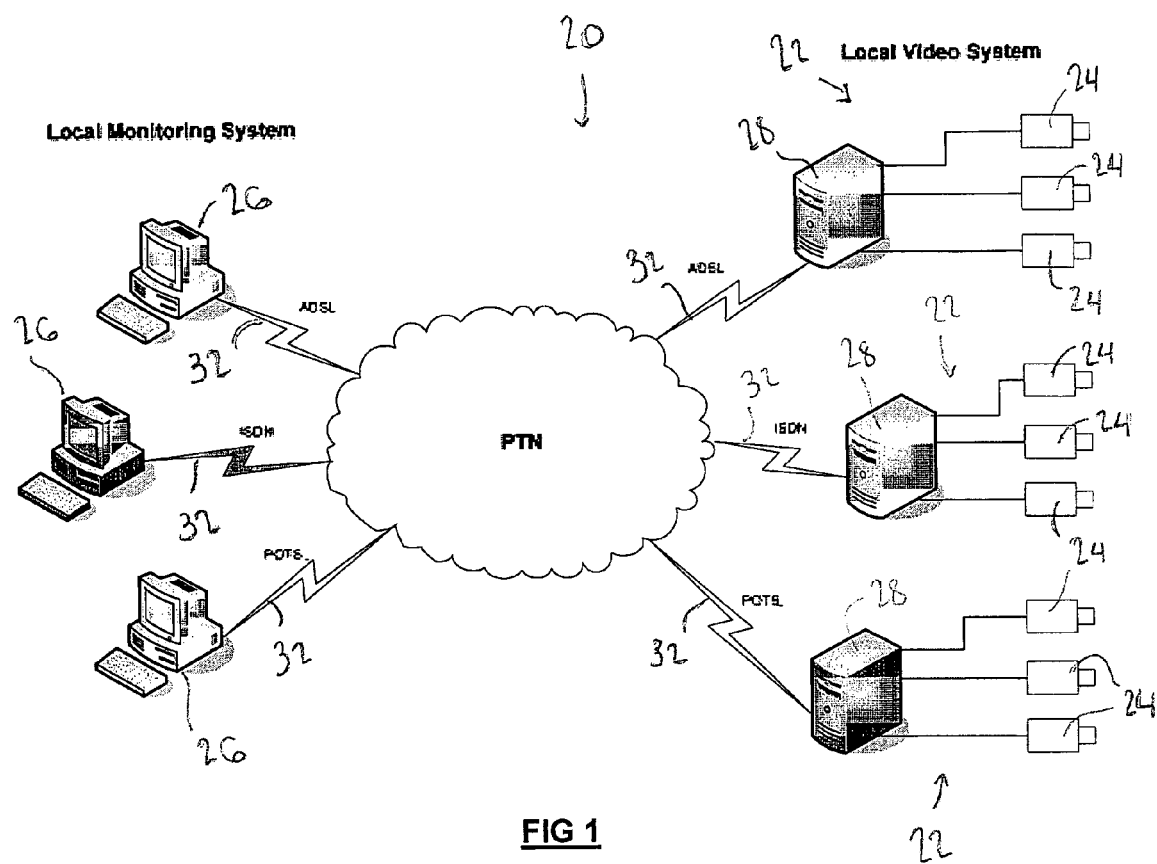
FIG. 1 is a schematic representation of a system according to a preferred embodiment of the invention.
Figure 2:
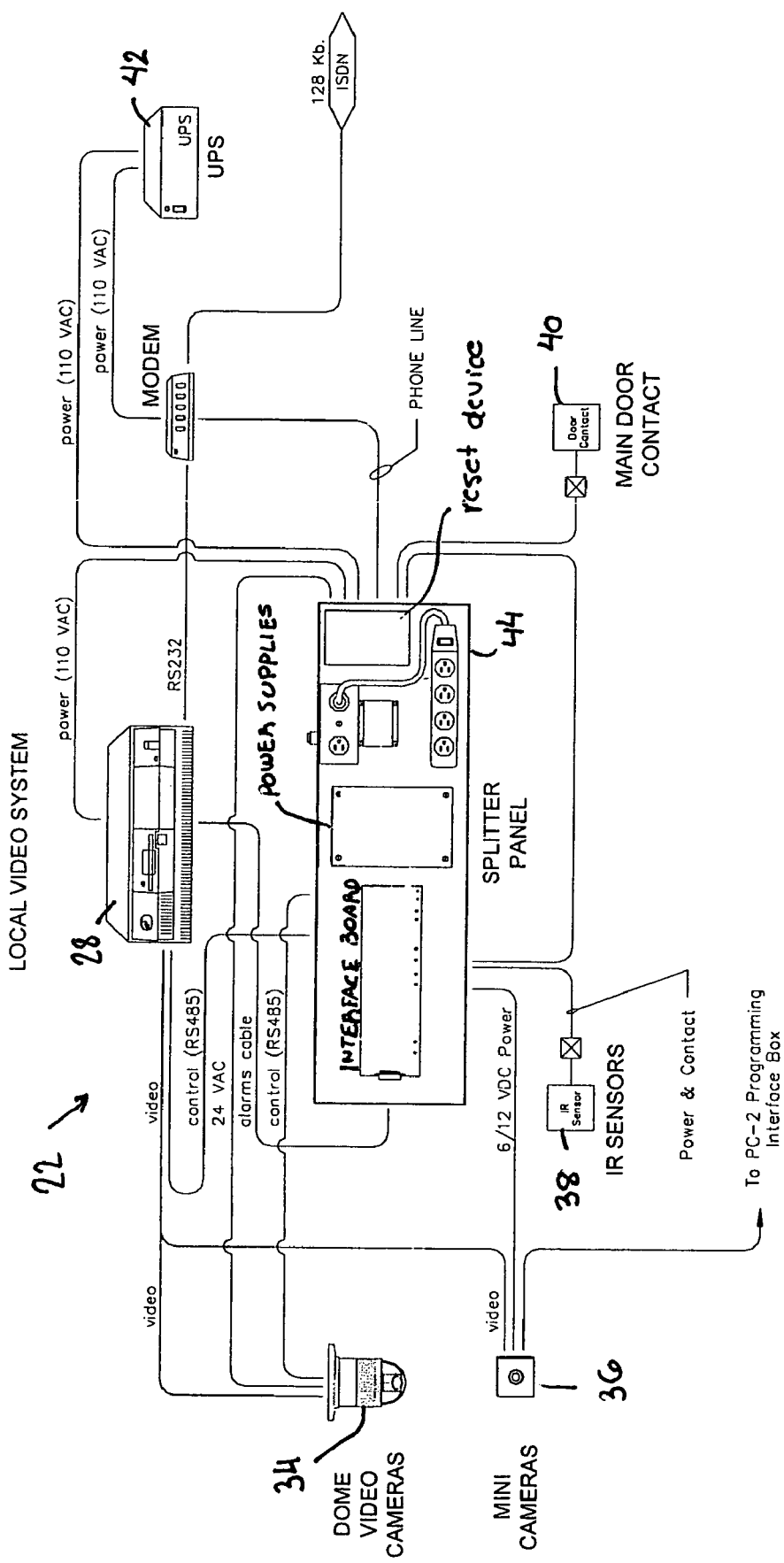
FIG. 2 is a schematic representation of the components of a remote station of the system of FIG. 1.

Referring to FIGS. 1 and 2, there is shown a video network 20 to which the present invention is applied, which includes a plurality of remote stations 22, at which one or more digital video cameras 24 are installed and running. The system of the present invention includes at least one central server 26 running a central application. Although the present invention will be described hereinafter with reference to a single server 26, it is understood that the principles of the invention may be generalized to a system having a plurality of local monitoring servers 26 each monitoring at least a fraction of the remote stations 22 of the network 20. At each remote station, a digital video recording unit 28 (DVR) is provided, operatively connected to each camera 24 of the same station. This unit may be embodied by appropriate software running over any Windows Pentium based PC platform or any equivalent system. The locations of the remote stations can be at any distance from the central server 26, as long as electronic communication therewith is possible. Any appropriate communications media 32 can be provided for this purpose, such as telephone lines POTs, TCP IP, ISDN, satellite communications, etc.

Referring to FIG. 2, various possible video recording components of a remote station 22 are shown. The digital video recording unit 28 is connected to a plurality of recording or sensing devices such as dome video cameras 34, mini-cameras 36, IR sensors 38, and door contacts 40. The components are powered by power source 42 through splitter panel 44.

The digital video cameras 24 of a given remote station 22 can be of any type appropriate for video surveillance or similar activities. The cameras from one station to the next or even within a same station may be of different models or from different companies without affecting the method of the present invention.

The central application is the software which operates the system and method according to the present invention and its preferred embodiments. It preferably includes all the data and instructions to perform the steps of the method as explained below, using the hardware of the system generally described above.

The method includes a first step of a) defining a plurality of scripts files. Each script file contains diagnostic instructions for performing a diagnostic of at least one of the video system components of a remote station. The expression "video system components" as used herein may refer to the DVR, the cameras, sensors, or any peripheral and associated components encompassing a video system. A number of script files may be arranged in a group sequence.

The second step of the method is b) the defining of a schedule, which assigns an execution time for each of the scripts, if script files form a group sequence, a single execution time may be assigned to the entire group, and the scripts of this group are then put in a queue and executed one by one. Execution time in the schedule may be recurrent, for example re-executing a script every day at the same time, or punctual where it would only activate once.

In accordance with the next step c), time is monitored with reference to the schedule so that each script is timely executed. In the preferred embodiment, a timer verifies the system's hour and day (if the schedule is recurrent) and the date and hour (if the schedule is punctual). Should the day and/or date be identical; the system interprets the script or sequence. The schedule is preferably synchronized periodically with a standard reference time. This may be done manually at the central server or automatically at a predetermine time. In the preferred embodiment, the application's clock is synchronized every day at nighttimes from an atomic clock site and is able to synchronize the hour of all sites keeping in mind the need to maintain time zones and daylight saving times.

Referring to FIGS. 4 to 9, various windows of a user interface of the central application are shown by way of example illustrating the functionalities of the three steps above. In this embodiment, the schedule is the central point of the application from which you access its functions.

Figure 4:
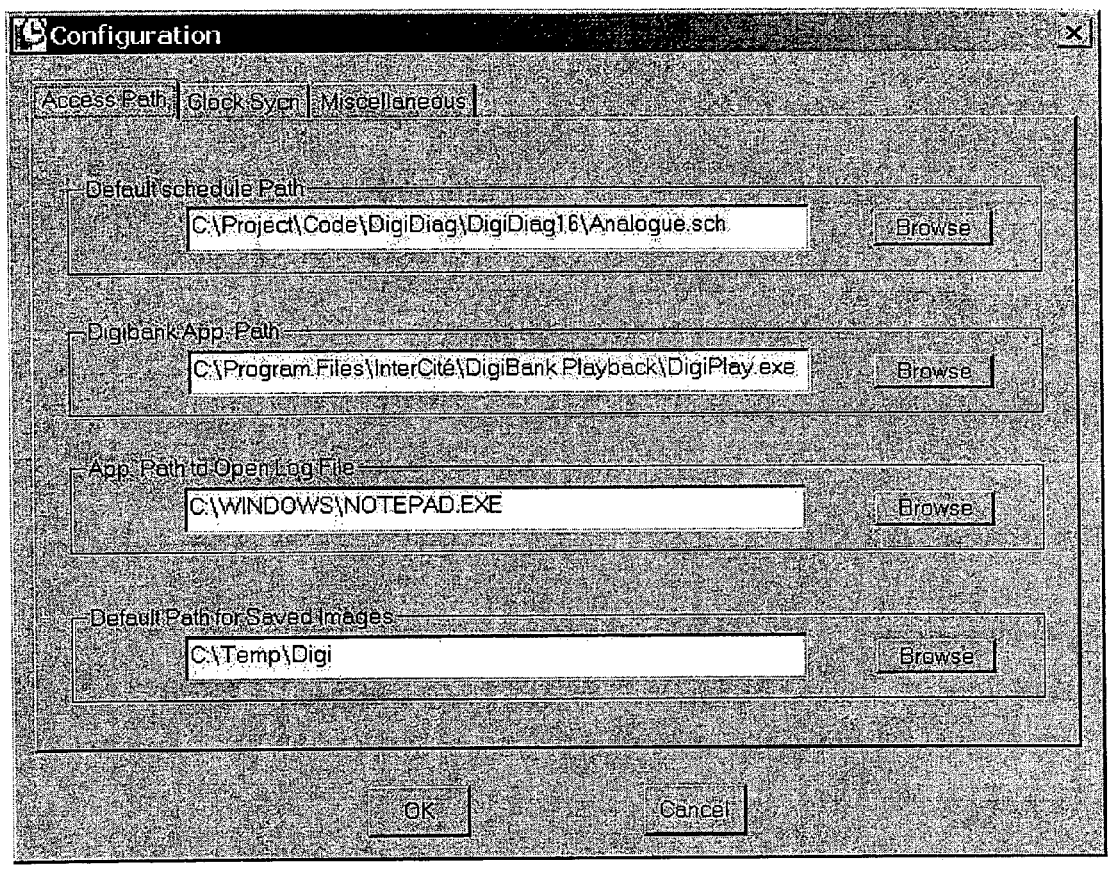
FIG. 4 is a window from which the various paths for schedules, application exe's, logs and image saving may be selected according to a preferred embodiment of the invention.
Figure 5:
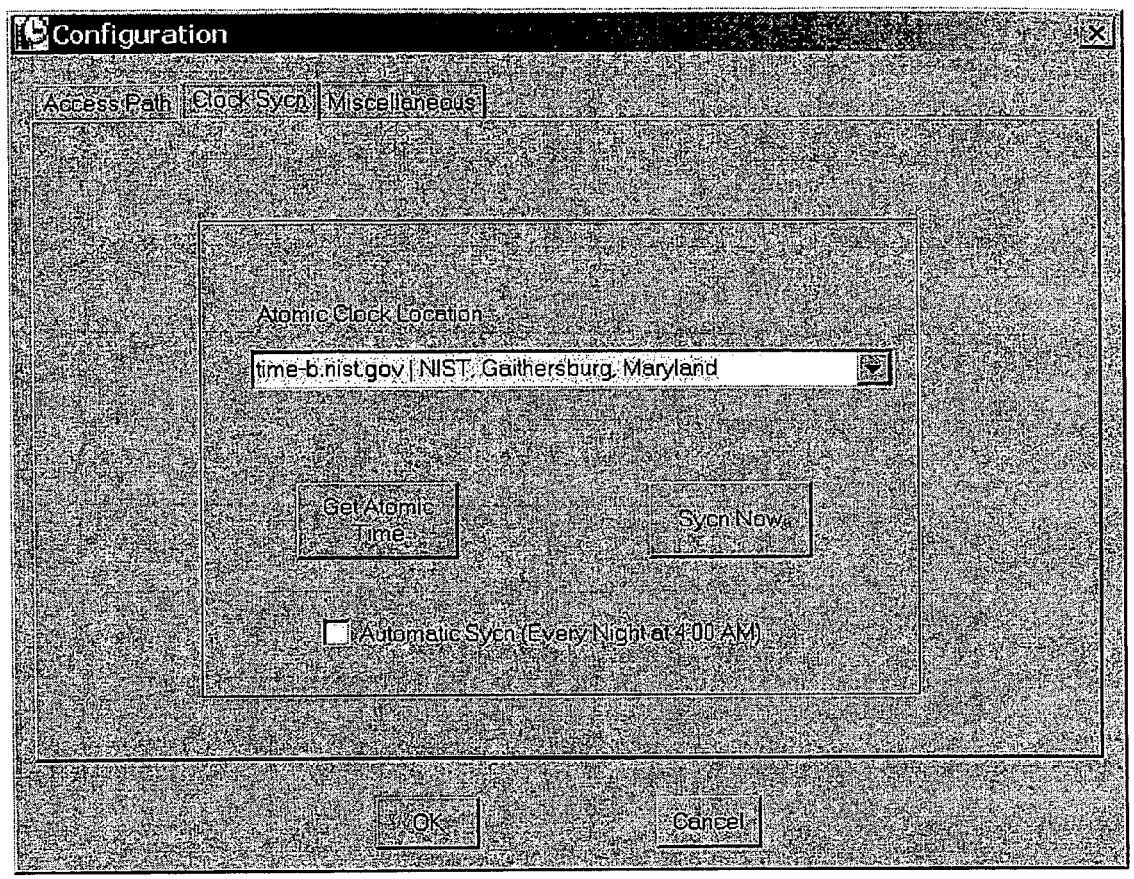
FIG. 5 is a window showing the time synchronization of the central application.
Figure 6:
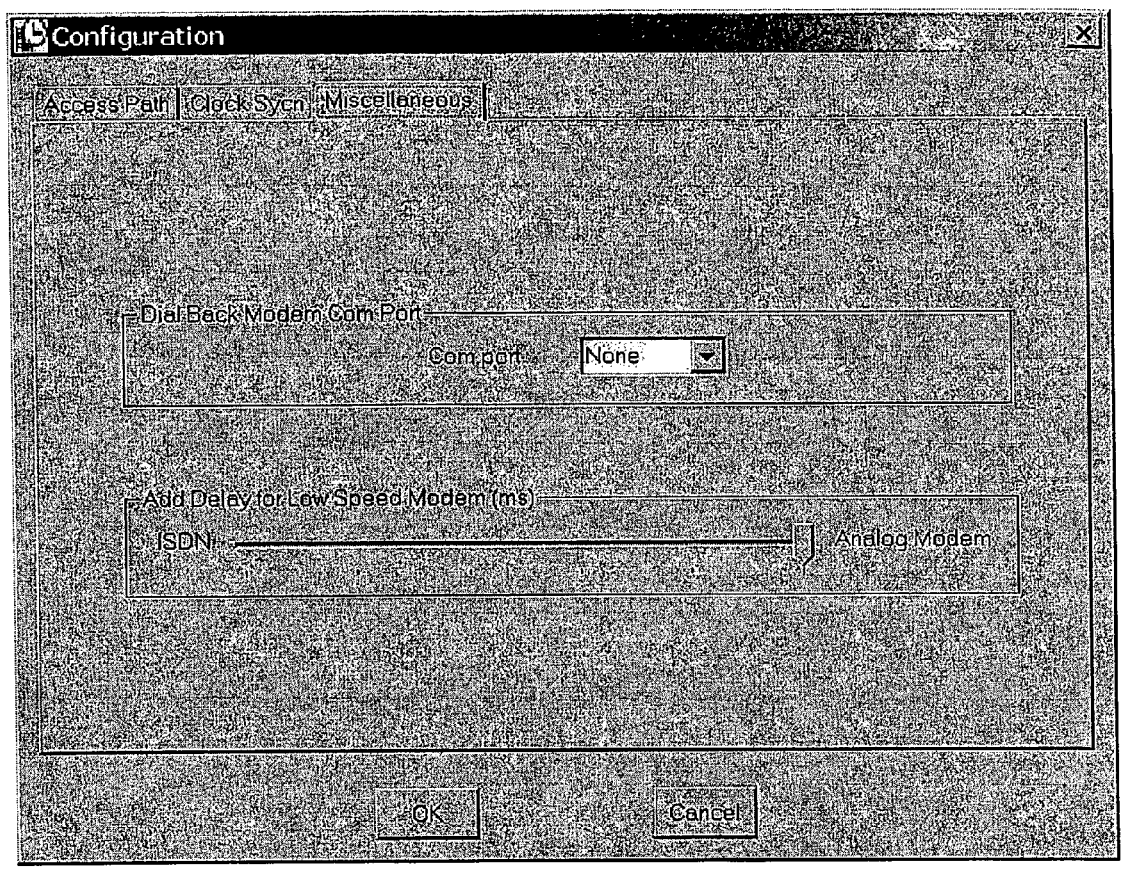
FIG. 6 is a window from which access speed variability when using ISDN, POTS or any other dial-up means is selected.

FIGS. 4 to 6 show different configuration options of the central application. From the window of FIG. 4, the various paths for schedules, application exe's, logs and image saving may be selected. FIG. 5 illustrates the standard time synchronization of step c) defined above. FIG. 6 helps to configure communications with a given remote site.

Figure 7:
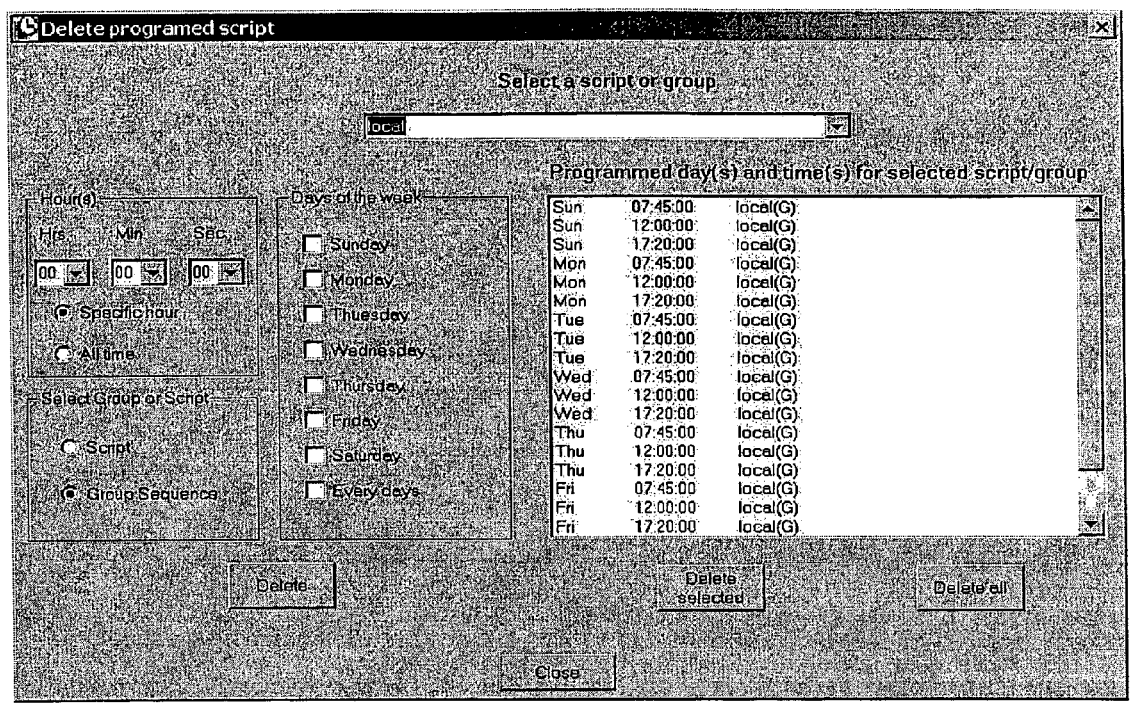
FIG. 7 is a window displaying execution times assigning by the schedule.
Figure 8:
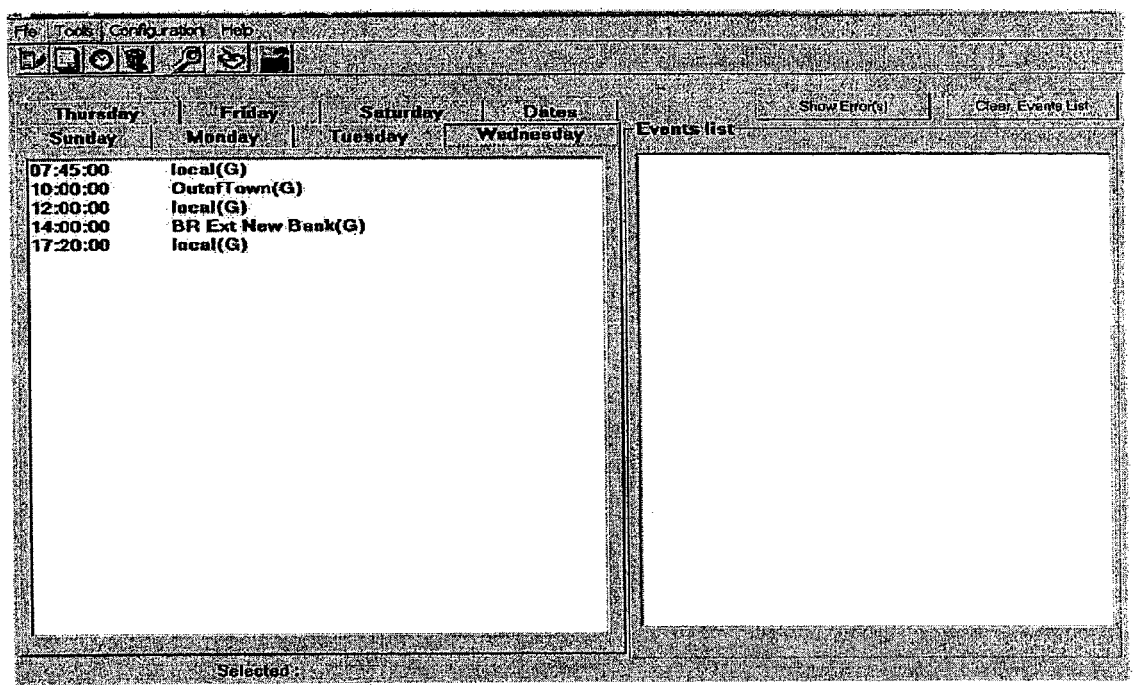
FIG. 8 is a window showing the schedule for a given day.
Figure 9:
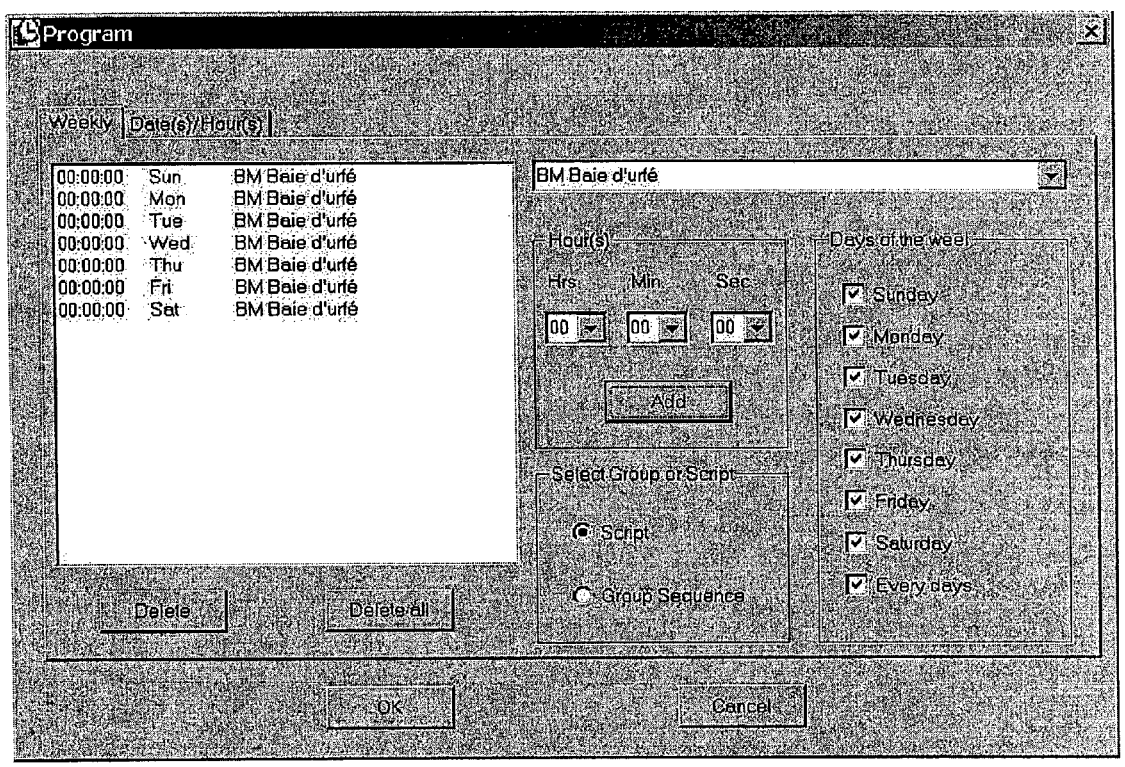
FIG. 9 is a window showing the schedule for a given remote station.

FIGS. 7 to 9 are examples of windows of the central application from which scripts and their execution times can be managed. FIG. 7 shows a window from which one or a group of scripts may be deleted from the schedule. The window of FIG. 8 shows the scripts and group sequences that have been set for each specific day and time. Each day of the week appears on a tab. The execution time of the scripts shown in this example is recurrent; once an item is set, it executes every week at a specific day and time and hour. One selects the "Dates" tab to program a script that will execute only once, at a specific date and time. That type of schedule is called "punctual". Whenever a script executes, the tasks and checks are added to the list of transactions. That list is preferably copied into a log file. FIG. 9 shows similar script control options but for a given remote station.

Figure 3:
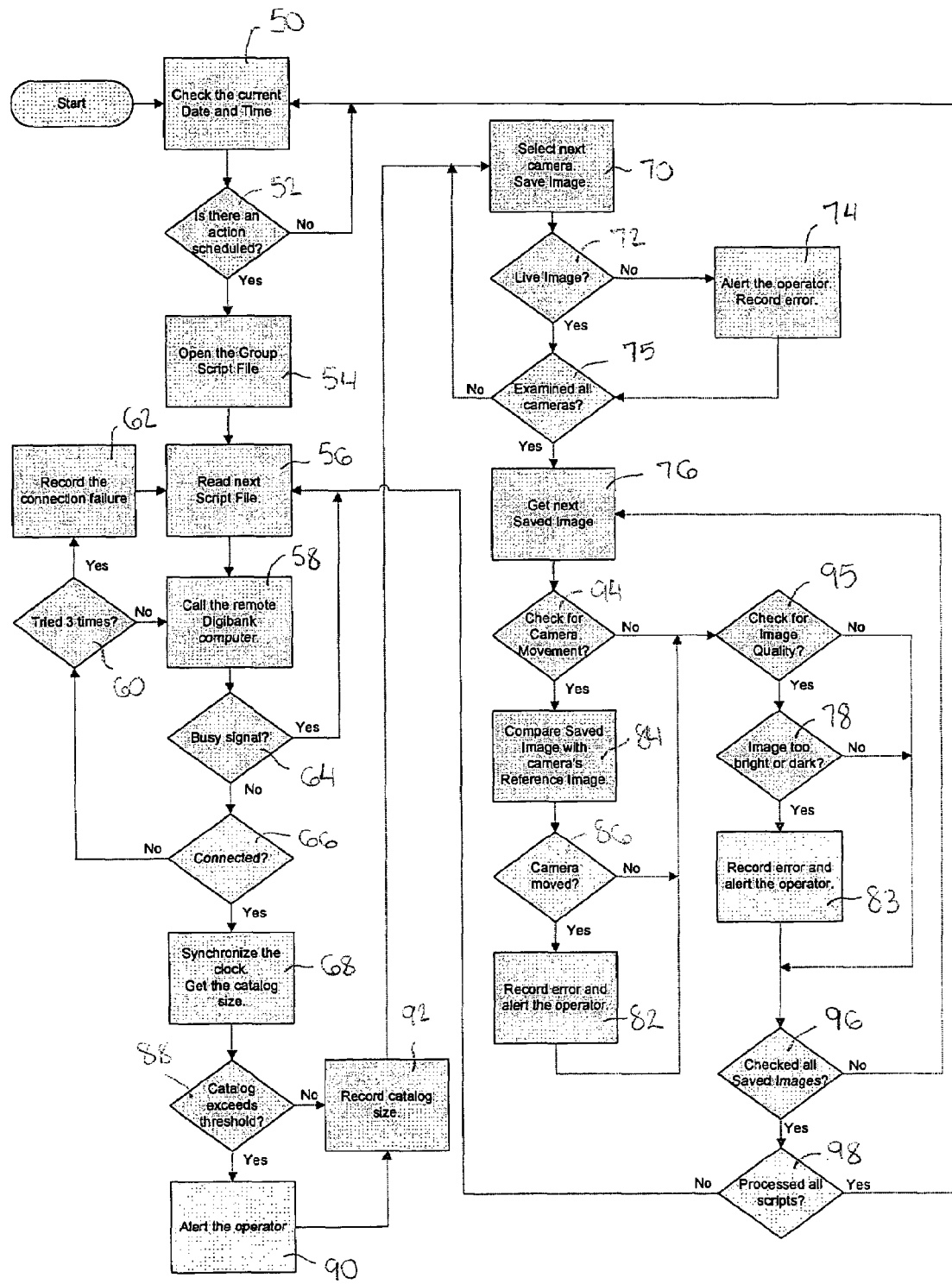
FIG. 3 is a flow chart illustrating a method according to a preferred embodiment of the invention.

Referring to FIG. 3, there is shown a flow chart illustrating the execution of the script files according to a preferred embodiment above. As explained with reference to step c) above, the current date and time is checked 50 and compared to the schedule to see if it matches the execution time of an action scheduled 52. When such a time is reached the corresponding script file is opened and read. If the execution time is associated with a group sequence, than this group is opened 54 and the next script file is read 56. Each instruction of the script is executed and the method then moves on to the next file of the sequence until all the scripts therein have been processed 98.

Communication is then established 58 with the corresponding remote station. Preferably, the operation of the remote stations is controlled by a station controller unit operationally connected to the digital video cameras on site, which in the preferred embodiment is a Digibank (trademark) computer. Preferably, if the call is unsuccessful three times 60, the failure to reach the corresponding remote station is recorded 62 and the method goes to the next script of the sequence, or goes back to time monitoring if there is no more script files scheduled for this time. Also preferably, is the signal is busy 64, the method also moves on to the next file.

Once connection is established 66, the diagnostics instructions in the script file are executed. First, the clock of the remote station is preferably synchronized 68 with the a standard reference time, Then the proper functioning of each camera of the remote station can be checked.

In accordance with one of the features of the present embodiment, communication with the DVR units is done through automated interactions with its user control software. In this manner, the diagnostic instructions are inputted directly into the user control software, as if someone was physically present besides the DVR to interact with it. This is however done remotely and automatically. To provide for the delays in the execution of each instruction by the user control software, predetermined delays are provided between the inputting of each of these diagnostic instructions, based on characteristic response times of the user control software. Advantageously, by providing a proper interface for each video system model of a network, there is no restrictions on the type of equipment to which the present method may be applied.

In the preferred embodiment, the method includes reporting of the diagnostics performed and their result into a log file, which is preferably kept on the central server. In addition, every time a malfunction or possible error is detected a malfunction report is generated and transmitted to the operator of the network, for example by e-mail.

A first diagnostic performed by the method of the present embodiment is a verification of the catalogue size or memory retention for each video system. This function basically verifies the date of the first image in the catalogue at the remote site and renders a numerical value, preferably in weeks, based on comparing that first image date with the present date. These values can be charted over the year so as to gain a clear perspective of memory usage over certain times of increased activity. This chart may be made available to network owners and allows them to set and define trends and facilitate the planning of network bandwidth controls based on actual historical values.

In accordance with this diagnostic, the catalogue size is obtained 68, and compared 88 to a predetermined threshold. The network operator is alerted 90 if this threshold is exceeded. In any event, the catalogue size is recorded 92 for future reference.

This function allows for continuous verification of the catalogue range which is a very important feature as the catalogue usually contains sensitive data, i.e.: transactions, frauds, robberies, process control and time span data etc.

The threshold for an out of norm catalogue is adjustable as the catalogue is dynamic and will vary in size based on many factors such as lighting conditions, activity level, type of activity and length of events. This application refers to local digital video recorders and may also advantageously apply to camera streamers which store video and other signal data at other locations (stations) over a network.

In this fashion should an abnormality negatively affect the catalogue and the associated images past the set threshold for that specific branch, network operators can investigate and react accordingly before the problem causes any severe impacts on safety and security.

In accordance with the present embodiment of the invention, another diagnostic executed by the method is a verification of the live functioning of each camera, thereby inherently assuring the functioning of the video frame grabbers, video streamers, processors, PC or dedicated platform etc. The last image recorded by each camera is accessed 70 and the time at which it was taken is compared to current time, establishing if the image is live 72. If the image is not live, the error is recorded and the operator of the network is preferably alerted immediately 74. The last image of each camera is preferably examined 75 before moving on to the next diagnostic.

As part of the executed diagnostics, there is preferably a camera analysis performed on each digital video camera of the remote station. This is preferably performed by a camera analysis application part of the central application, which includes appropriate means for performing the steps below.

The camera analysis first involves accessing 76 an image stored by a digital video recording unit, preferably the last image recorded by a given camera. The method then checks if this image is too bright or too dark 78. This is preferably done by comparing image parameters such as the average brightness level of at last some or all of the pixels of the image of the accessed image to predetermined image specifications. In the preferred embodiment, lower and upper brightness thresholds define an acceptable brightness interval there between, and the average brightness of the image should fall within this interval. If it does not, then the image parameters are advantageously reset automatically to fix the problem. The camera analysis may then be performed again, and if the average brightness level of the image still falls outside of the acceptable brightness interval a malfunction report is preferably generated and the operator alerted 83. We should note this analysis method allows for the detection of foreign materials on the camera lens housing window combination and or of defacements or obstructions even partial as either or of these conditions will trigger an error. The remote diagnostics software also permits to authenticate and process such abnormal image rendition over specific time spans to renders more accurate results thereby reducing the amount of false positives by ignoring temporary environmental factors. Advantageously, the malfunction report may be transmitted to the operator or any appropriate person by e-mail.

In the system of the preferred embodiment of the invention (see FIG. 2), an interface 43 on splitter panel 44 allows for remote resetting of specific devices upon certain detected failures. It can for example reload default, factory or specific programming data once a reset signal is initialized should the device offers such control. Without this line controller full remote diagnostics can still take place however without the benefit of remote self healings/repairs or alignments.

Another diagnostic that may be performed in accordance with the present method is a camera movement verification of any digital video camera of the remote station. The actual camera position and lens settings are important factors in the performance of any camera network, most particularly in the particular case of security systems. A camera which is not viewing the correct area, either during the initial install or following physical abuse, will null its purpose. The system of the present embodiment therefore advantageously provides an image movement application for the detection of physical displacement of cameras, as a result of tampering or otherwise.

Referring still to FIG. 3, in accordance with the method of this diagnostic, an image stored by each digital video camera is first accessed 76. Of course, the same image may be used to perform both camera analysis and camera movement verification, as well as any other diagnostic performed by the same system. The camera movement verification is preferably based on an analysis of average RGB color values for a template of pre-selected background cells of the accessed image, as compared with a reference image. An image of each camera to be verified is stored as this reference and accessed 84. The reference image is an example of what the camera should in fact be viewing. In accordance with the specifics of this reference image, a portion thereof is preselected for comparison. This portion is chosen so that it is likely to be generally unchanging over time, such as a fixed background which is unlikely to be blocked by normal activities at the remote site. A good choice is usually along the upper borders of the image, since the normal operating environment is usually located in the center of the image. The average RBG value of these pre-selected background cells is compared to the average RGB value of the corresponding cells of the current camera image. Both values being within a predetermined interval of each other will determine if the camera has moved 86. In the event it has, the error is recorded and the operator alerted 82.

A preferred embodiment of the camera movement application's particulars will now be presented. The selected portions of the reference image are preferably divided into sixteen cells, for example eight along the top and eight along the bottom of the image. Of course, any appropriate number of cells may be selected to be monitored and analyzed. In the preferred embodiment, each cell is composed of 1600 pixels (40×40). Each value R(red), G(green) and B(blue) is read from the reference image and divided by 1600. This provides the average color RGB value for each cell. These values are stored in a .cmp file, to be used as the reference to analyze and compare with the live image.

Upon execution of the image verification application to a given remote station, the values stored in the original .cmp file, corresponding to selected cells from the reference image, is compared with the same analysis performed on the live image. Each R, G and B value resides between the numerical value of 0 and 255. The comparison between the reference image and the live image provides a specific absolute value difference for R, G and B. This specific difference is named Diff_R, Diff_G and Diff_B. If the result, taking into account the sensitivity level, is greater than a value of 96, default sensitivity level value being 48, then the camera is considered to have moved and appropriate measures are taken. Should the specific difference not fall into the region of detection, no action will be taken and the application moves on to the next analysis to be performed.

Preferably, the highest between Diff_R, Diff_G and Diff_B is stored and used as a reference for the next calculation. This reference is then subtracted from Diff_R, Diff_G and Diff_B. Should the result from one of the RBG Diff_be greater than 20, the program will alert of the status and generate an email to warn of the camera movement. This specific test is employed to allow for variations in lighting conditions. This test can also be averaged over specific time spans to afford a higher level of precision and accuracy.

The description of this analysis is applied to each of the selected cells on a specific camera. Any one cell which does not pass this test will engender the program to alarm and log the incorrect status. The trigger level (threshold) and sensitivity of detection can also be adjusted.

Figure 14A:
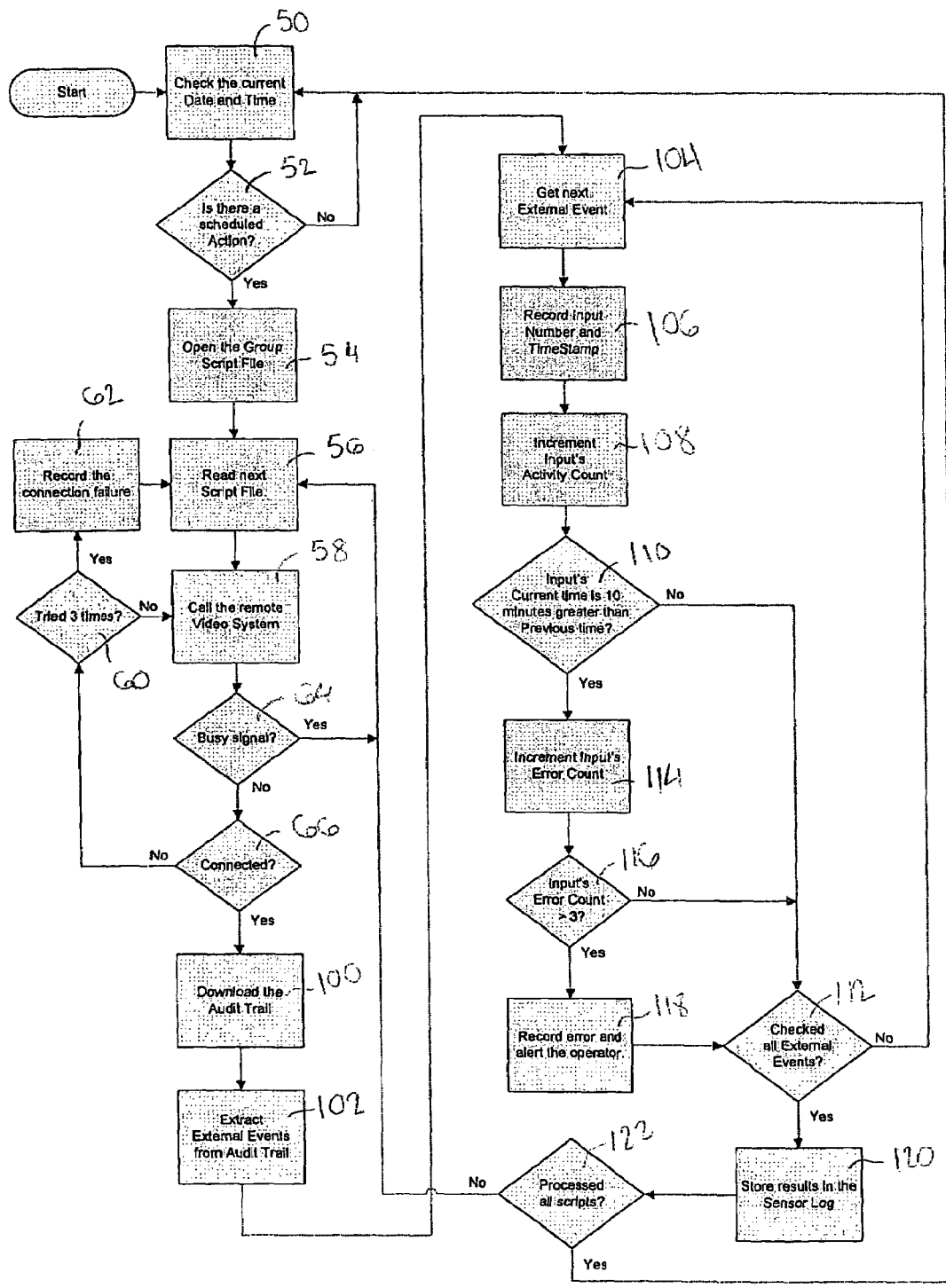
FIGS. 14A and 14B are flow charts respectively illustrating daily and weekly audit trail analyses according to another preferred embodiment of the invention.
Figure 14B:
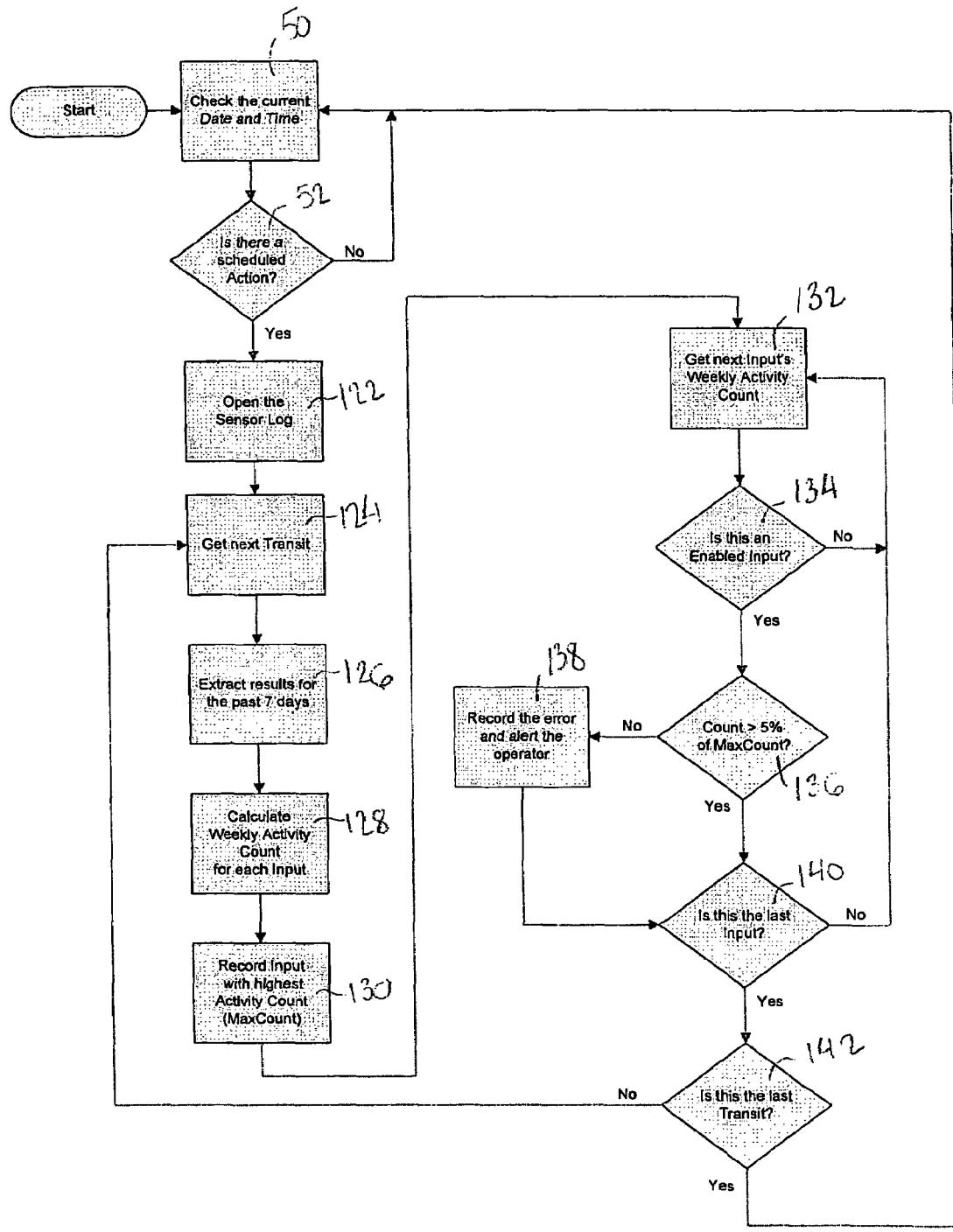

Referring to FIGS. 14A and 14B, another embodiment of the invention is presented where the network includes sensors, and a remote trail analysis is performed on these sensors.

The Audit Trail Analyzer (ADA) examines a Local Video System's Event Log and identifies the following sensor characteristics:

Shorted
Open
Low-Activity
High-Activity

Upon detection of a specific characteristic, ADA notifies the operator via email.

ADA operates on a daily and weekly basis. "Daily ADA" (FIG. 14A) captures and examines each site's Audit Trail. It records its findings in the Sensor Log and reports shorted sensors to the operator. "Weekly ADA" (FIG. 14B) examines the Sensor Log and reports Open, Low-Activity, and High-Activity sensors.

If a sensor is triggered, an event is registered in the Audit Trail indicating the date, time, and sensor name. If a sensor is shorted, an event will be logged every ten minutes. Daily ADA searches the Audit Trail for events that repeat every ten minutes and reports the sensor's name to the operator.

Referring to FIG. 14A, there is show a flow chart of an exemplary daily audit trail analysis. The first steps are the same as the flow chart of FIG. 3 until connection with a remote station is established 66. Then the audit trail is downloaded 100 and the recorded external events are extracted therefrom 102. Each external event is examined sequentially 104. For each event, the Input number and Time stamp are recorded 106, and the Input's Activity count is incremented 108. The analyser then checks if the Input's current time is 10 minutes greater than the previous time 110: if not, the analyser moves on to the next image 112. If so, then the Input' error count is incremented 114, and if its new value is greater then three 116 an error is detected, recorded and the operator is alerted 118. Once all external events have been processed, the result of the analysis is stored in a sensor log 120 and the method moves on to the next script, if any 122.

If a sensor is open, it will never log an event in the Audit Trail. Using the Sensor Log, Weekly ADA examines the Activity Count for each sensor. At a given site, the sensor with the highest Activity Count (excluding Shorted sensors) is recorded as MaxCount. All remaining sensors are compared to MaxCount. If a sensor's Activity Count is less than 5% of MaxCount, then it is reported to the operator.

Referring to FIG. 14B, an exemplary embodiment of a weekly audit trail analysis is illustrated. In this example, at the proper time the sensor log is opened 122 and each transit is obtained 124 and analysed. The results of the daily ADA for the last seven days are extracted 126, and a weekly activity count is calculated 128 for each input. The "Maxcount" value is assigned to the input with the week's highest activity count 130. The weekly activity count is then obtained for each input 132, and verified to see if the input is enabled 134. If its count is at least 5% greater then Maxcount 136, an error is detected and the operator alerted 138. The analyser otherwise moves on to the next input 140 and once all inputs have been checked moves on to the next transit 142 until they have all been checked.

In the preferred embodiment, the ADA is ran completely separate from the remote diagnostics main application, hence the separate flow charts. However, it could alternatively be integrated with other diagnostics if desired.

It is understood that a given script file may contain instructions to perform any selection of the particular diagnostics described above, or others, in an appropriate order. In the exemplary flow chart of FIG. 3, the method first checks the catalogue size and live image, and then proceeds to check for camera movement 94, perform the camera analysis 95 or both, until all the saved images from the remote station's cameras have been checked 96.

An example of execution of the above method will now be described in more details.

The Schedule is the central point of the application from which one accesses its functions. It can show the network's operator the scripts and group sequences that have been set for each specific day and time.

Each day of the week appears on a tab. The schedule is recurrent; once an item is set, it executes every week at a specific day and time and hour. Select the Date tab to program a script that will execute only once, at a specific date and time. That type of schedule is called "punctual". Whenever a script executes, the tasks and checks are added to the list of transactions. That list is copied into a .log file.

Schedules are controlled by a timer, which verifies the system's hour and day (if the schedule is recurrent) and the date and hour (if the schedule is punctual). Should the day and/or date are identical; the system interprets the script or sequence.

Scripts from a sequence are read and placed in a queue. The first script executes. The interface takes control of the reading software of the DVR while verifying the Windows handlers. It searches for the specific application using the driver name, seizes it and inputs its handling number to which it will refer when using the Windows' SendMessage API.

The application control is then initiated, and the check process occurs without the intervention by a user. Every task is completed based on a specific timing, which can be modified according to the communication mode requirements (ISDN, POTS, network etc. . . . )

A timer executes to verify if an error has occurred (e.g. when downloading an image) to send a "mouse left key and click" command using the Window's SendMessage API. Once every camera is checked, the system hangs up and executes the next script (if within a sequence).

Each script is used to perform tasks and checks over a distant site (DVR). First the site phone number is entered, then the password and number of cameras, and the number of weeks before an archiving event is flagged. Information such as Email addresses or phone number that must be called and receive notifications when the digital video recorder unit or system is found defective as well as passwords are all recorded in a SCT file in a text mode.

Scripts can be programmed one by one or through batch programming. To simplify their programming, scripts are clustered into sequences that contain at least two scripts. Sequences are programmed just like a single script; however, because their multiple scripts execute sequentially, there is no need to enter an off time between each. As soon as a script is complete, the next one executes.

From the interface, one may choose to program a single script or a sequence. The hour and days of the week are entered if a recurrent schedule is used or the date and hour for a punctual schedule. Items selected will be displayed and show what time or day(s) it will execute. Creation and changes to a script are done through the interface. Selecting this interface allows to add or clear scripts to a sequence.

Camera Analysis is also done through the interface. The pixel colour of every image stored is analysed. When an image is blooming, too bright or dark, an alarm is sent by email. The base trigger levels can be specified on every script before an alarm is sent.

The application's clock is synchronized every day at nighttimes from an atomic clock site and is able to synchronize the hour of all sites keeping in mind the need to maintain time zones and daylight saving times.

The application is based on a schedule that activates the tasks automatically and at a specific time. Each site is first configured in a script that contains information such as the number to call, the password, the number of cameras and their base parameter information and their time zone.

Specific errors automatically generate service reports when the remote control auto diagnostics software is unable to mitigate the defect. The application can and will try to reset either the fixed digital capture devices, the mobile capture units, the PC recording platform and or any other controllable device depending on the location of the failure. If an error occurs at the time of the connection, a report is automatically sent to a log file and the site is rebooted via either a soft boot or a hard (power off) boot. The remote resetting functions are controlled by a commonly available remote line controller with multiple output control ports. The hardware devices which would require a reset signal at the time of failure are wired through this controller.

At the time of the connection, each camera is checked. If a camera is found defective, a report is automatically sent to a log file. In addition, the quality rendition of the capture devices throughout the processing sections is checked.

The time clock of each site is synchronized with the server, which clock is automatically synchronized based on the Universal Time (Greenwich Time). The application sends an event by email when an error is detected on a site.

Accordingly to the schedule, the system then waits before communicating with the next site.

Figure 10:
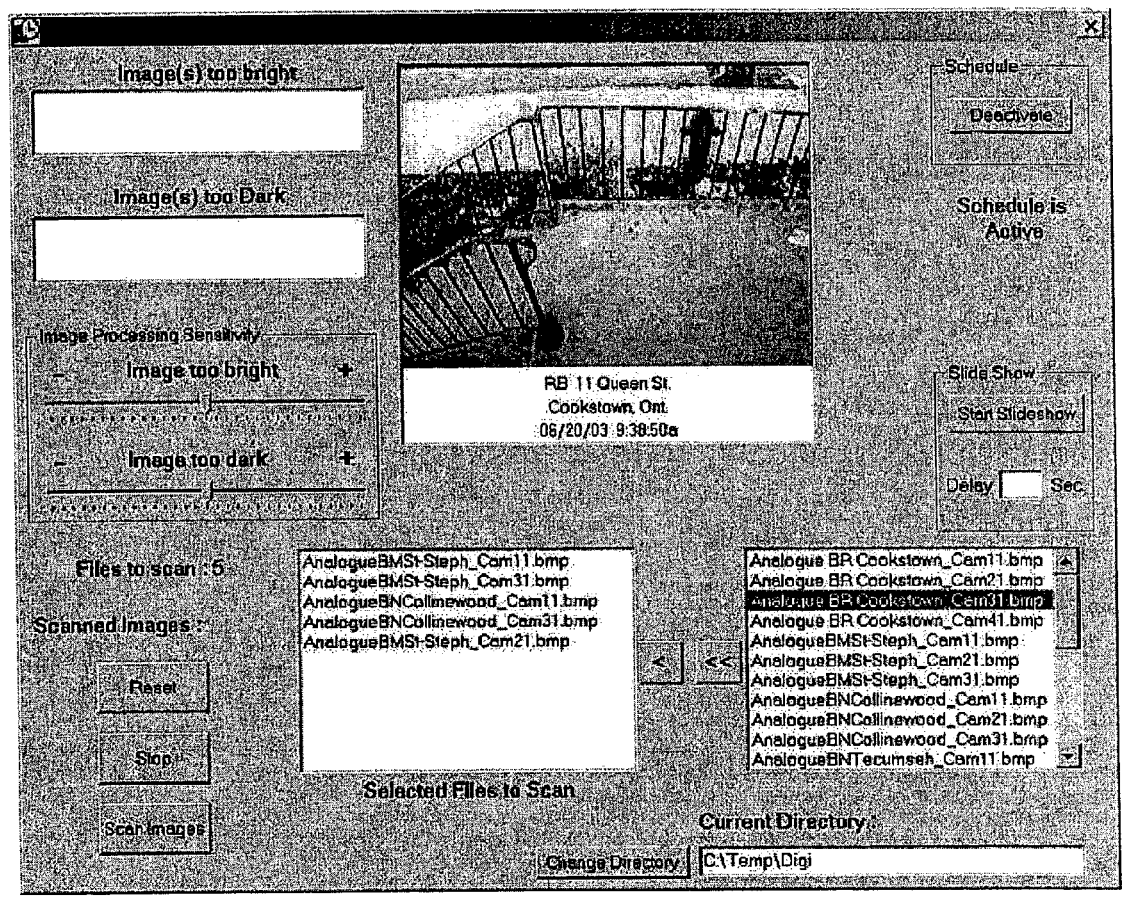
FIG. 10 is a window illustrating the execution of the camera analysis application.
Figure 11:
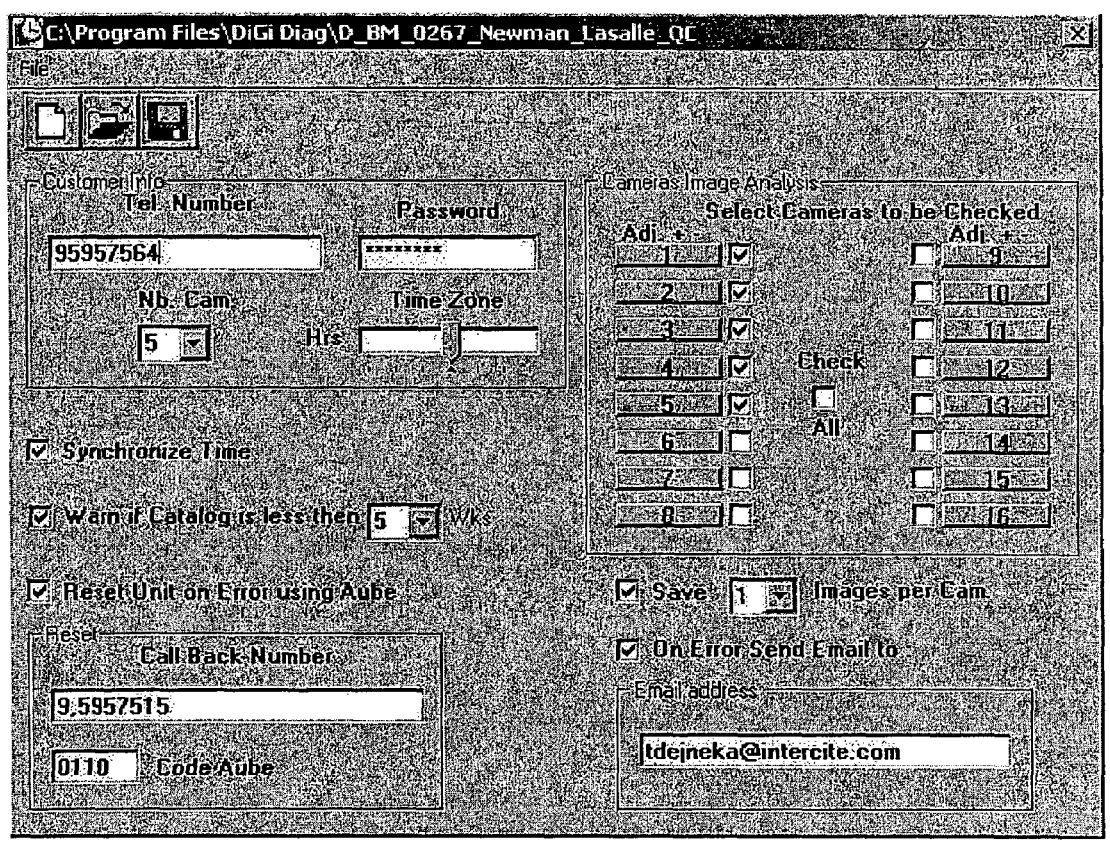
FIG. 11 is a window containing the information relative to a remote station.
Figure 12:
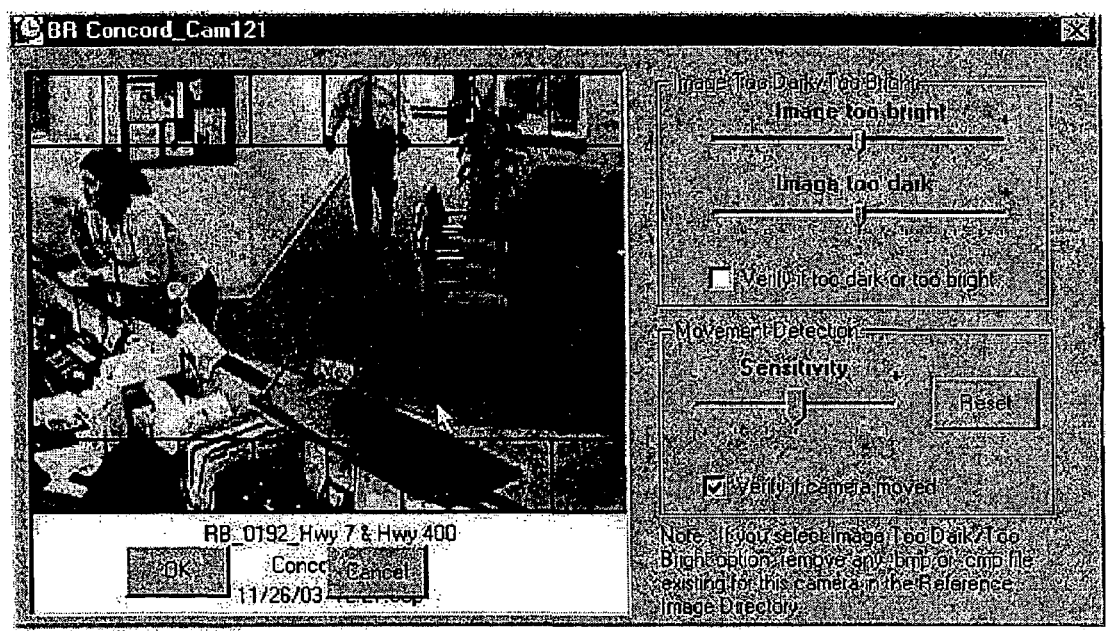
FIGS. 12 and 13 are sample screen captures of the camera movement application.
Figure 13:
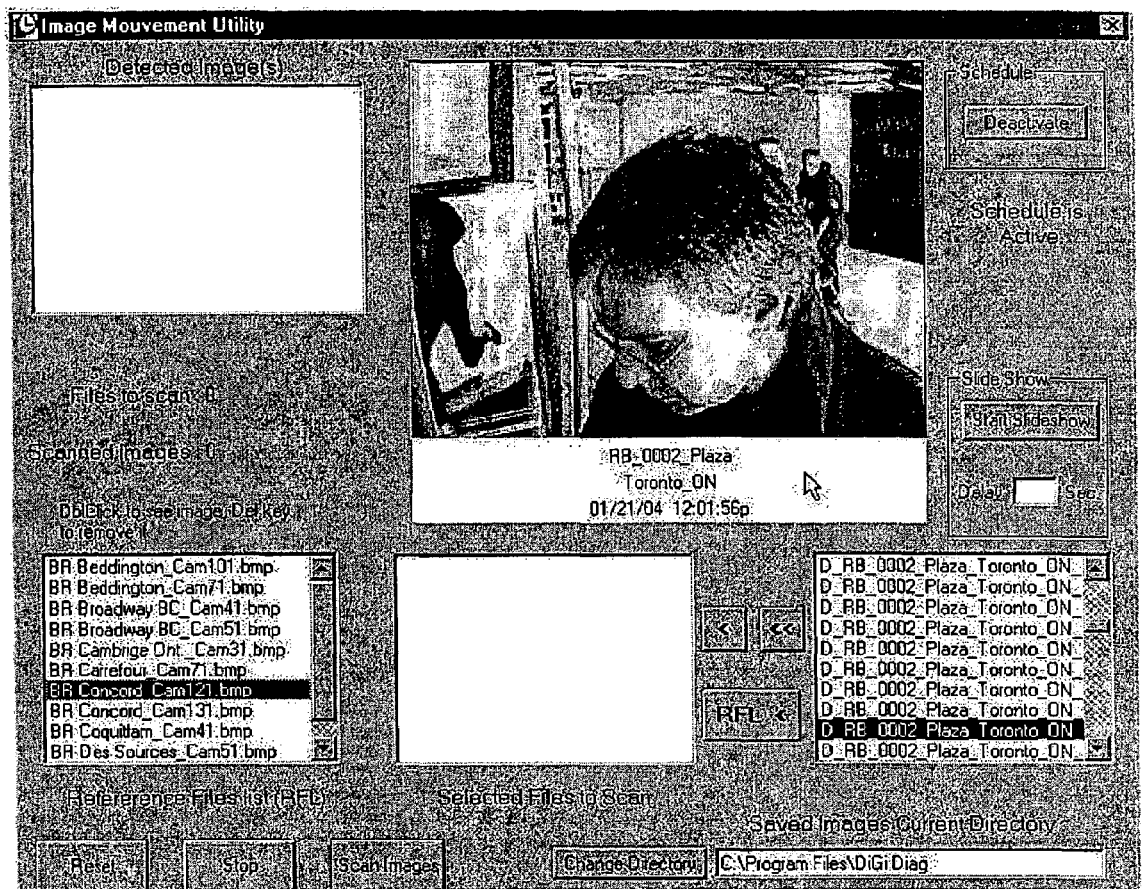

Referring to FIGS. 10 to 13, various windows of the central application related to the execution of the diagnostic instructions are shown. FIG. 10 shows the execution of the camera analysis. FIG. 11 is a window allowing setting various site parameters for a given remote station. Finally, FIGS. 12 and 13 illustrate the execution of the movement verification application.

The methods above describe how the remote video system stations and the locally associated components can be verified for correct operation. In addition it should be noted and obvious to individuals skilled in the art that any operational parameters and data, information on system health, control, analysis, verification of the remote/distant video system site which are normally available either locally or via remote can be imbedded into the remote diagnostics system. Such components as but not limited to, the PC or industrial platform used for recording, transmitting or steaming information, local software and hardware and associated components such as sensors and input/output control devices can be integrated for verification in the remote diagnostics process.

Of course, numerous modifications could be made to the embodiments above without departing from the scope of the invention as defined in the appended claims.

The invention claimed is:

1. A method for automatically performing diagnostics of a digital video recording network, said video recording network including a plurality of remote stations each having a plurality of video system components, the method comprising the steps of:
   a) defining a plurality of scripts files each containing diagnostic instructions for performing a diagnostic of at least one of the video system components of a corresponding one of said remote stations;
   b) defining a schedule assigning an execution time for each of said scripts;

c) monitoring time with reference to said schedule; and d) upon reaching one of said execution times:
    v. opening the corresponding script file;
    vi. establishing communication with the corresponding remote station;
    vii. remotely executing the diagnostic instructions in said script file; and
    viii. returning to step c).

2. The method according to claim 1, wherein step a) comprises arranging a number of said script files into a group sequence, step b) comprises assigning a single execution time to the script files of said group sequence, and step c) comprises sequentially performing substeps i. to iii. for each of the script files of said group sequence before returning to step c).

3. The method according to claim 1, wherein the schedule comprises recurrent execution times.

4. The method according to claim 1, wherein the schedule comprises punctual execution times.

5. The method according to claim 1, wherein step d) ii. comprises automatically login on a digital video recording unit located at said remote station.

6. The method according to claim 5, comprising an additional substep between substeps d) ii. and d) iii. of synchronizing a time of said digital video recording unit with a standard reference time.

7. The method according to claim 1, wherein step d) iii. comprises:
    interfacing with a user control software of said digital video recording unit; and
    inputting said diagnostic instructions into the user control software.

8. The method according to claim 7, wherein step d) iii) further comprises allowing predetermined delays between the inputting of each of said diagnostic instructions.

9. The method according to claim 8, wherein said predetermined delays are selected based on characteristic response times of said user control software.

10. The method according to claim 1, wherein the executing of the diagnostic instructions of substep d) iii. comprises verifying if a digital video camera of the corresponding remote station is presently recording images.

11. The method according to claim 10, wherein said verifying comprises accessing a last image recorded by said camera, and comparing a time of recording of said last image to current time.

12. The method according to claim 1, wherein the executing of the diagnostic instructions of substep d) iii. comprises performing a camera analysis on a digital video camera of the corresponding remote station.

13. The method according to claim 12, wherein performing said camera analysis comprises executing the substeps of:
    accessing an image recorded from said video camera; and
    comparing image parameters of said image to predetermined image specifications.

14. The method according to claim 13, wherein said image parameters comprise an average brightness level of a plurality of pixels of said image.

15. The method according to claim 14, wherein said predetermined image specifications comprise a lower and an upper brightness threshold defining an acceptable brightness interval therebetween.

16. The method according to claim 15, wherein step d) iii. comprises resetting said image parameters if the average brightness level of said image falls outside of said acceptable brightness interval.

17. The method according to claim 16, wherein step d) iii. further comprises, after said resetting of the image parameters, performing said camera analysis again, and generating a malfunction report if the average brightness level of said image still falls outside of said acceptable brightness interval.

18. The method according to claim 17, further comprising transmitting said malfunction report by e-mail.

19. The method according to claim 1, wherein the executing of the diagnostic instructions at substep d) iii. comprises performing a camera movement verification on a digital video camera of said corresponding remote station.

20. The method according to claim 19, wherein said camera movement verification comprises executing the substeps of:
    accessing an image recorded from said digital video camera;
    calculating an average RGB color value for pre-selected background cells of said image; and
    comparing said average RGB value of said background cells to reference RGB values therefor.

21. The method according to claim 20, wherein said camera movement verification further comprise generating a camera tampering report if the comparing of said average and reference RGB values fall outside of a predetermined difference range.

22. The method according to claim 1, wherein the executing of the diagnostic instructions at substep d) iii. comprises verifying if a catalogue of images recorded by a digital video recording unit of the corresponding remote station exceeds a predetermined threshold.

23. The method according to claim 1, wherein the executing of the diagnostic instructions at substep d) iii. comprises performing an audit trail analysis of a sensor of the corresponding remote station.

24. The method according to claim 23, wherein said audit trail analysis comprises determining if said sensor is shorted.

25. The method according to claim 23, wherein said audit trail analysis comprises determining if said sensor is open.

26. The method according to claim 23, wherein said audit trail analysis comprises verifying an activity level of said sensor.

27. The method according to claim 1, wherein the executing of the diagnostic instructions at substep d) iii. comprises reporting on the executing of substep d) iii. in a log file.

28. A system for automatically performing diagnostics of a digital video recording network, said video recording network including a plurality of remote stations each having a digital video recording unit connected to a plurality of video system components, the system comprising:
    a central server provided with a central application, said central application including:
        a plurality of scripts files each containing diagnostic instructions for performing a diagnostic of at least one of the video system components of a corresponding one of said remote stations;
        a schedule assigning an execution time for each of said scripts; and
        time monitoring means for monitoring time with reference to said schedule; and
    communication means for putting the server in communication with the digital video recording unit of a corresponding remote station at each execution time and transmit the corresponding diagnostic instructions from said central server to said digital video recording unit.

29. The system according to claim 28, wherein a number of said script files are arranged into a group sequence, the schedule assigning a single execution time to the script files of said group sequence.

30. The system according to claim 28, wherein the schedule comprises recurrent execution times.

31. The system according to claim 28, wherein the schedule comprises punctual execution times.

32. The system according to claim 28, wherein each of said script files further comprises connecting information for allowing the central server to access the corresponding digital video recording unit through said communication means.

33. The system according to claim 28, wherein said central application further comprises a DVR interfacing application for each digital video recording unit of said system, each of said DVR interfacing applications comprising means for remotely interfacing with a user control software of the corresponding digital video recording unit.

34. The system according to claim 33, wherein said DVR interfacing application comprises means for inputting the diagnostic instructions of the corresponding script file into said user control software.

35. The system according to claim 34, wherein said DVR interfacing application further comprises a timer for setting predetermined delays between the inputting of each of said diagnostic instructions.

36. The system according to claim 35, wherein said predetermined delays are based on characteristic response times of said user control software.

37. The system according to claim 28, wherein said central application further comprises means for synchronizing a time of each of said digital video recording units with a standard reference time.

38. The system according to claim 28 in combination with said plurality of video system components of each remote station of said video recording network.

39. The combination according to claim 38, wherein said video system components of each remote station comprises at least one digital camera.

40. The combination according to claim 39, wherein said central application comprises, for each said digital cameras, a live camera verification application for generating a subset of said diagnostic instructions.

41. The combination according to claim 40, wherein said live camera verification application comprises accessing means for accessing a last image recorded from at least one of said cameras, and comparing means for comparing a time of recording of said last image to current time.

42. The combination according to claim 39, wherein said central application comprises, for each digital cameras of said network, a camera analysis application for generating a subset of said diagnostic instructions.

43. The combination according to claim 42, wherein each of said camera analysis application comprises:
    accessing means for accessing an image recorded from the corresponding digital video camera; and
    comparing means for comparing image parameters of said image to predetermined image specifications.

44. The combination according to claim 43, wherein said image parameters comprise an average brightness level of a plurality of pixels of said image.

45. The combination according to claim 44, wherein said predetermined image specifications comprise a lower and an upper brightness threshold defining an acceptable brightness interval therebetween.

46. The combination according to claim 45, further comprises resetting means for resetting said image parameters if the average brightness level of said image falls outside of said acceptable brightness interval.

47. The combination according to claim 46, wherein said resetting means comprise a line controller connected to the corresponding digital camera.

48. The combination according to claim 39, wherein said central application comprises, for each digital camera, a camera movement application for generating a subset of said diagnostic instructions.

49. The combination according to claim 48, wherein said camera movement application comprises:
    accessing means for accessing an image recorded from said digital video camera;
    calculating means for calculating an average RGB color value for pre-selected background cells of said image; and
    comparing means for comparing said average RGB value of said background cells to reference RGB values therefor.

50. The combination according to claim 49, wherein said camera movement application further comprise reporting means for generating a camera tampering report if the comparing of said average and reference RGB values fall outside of a predetermined difference range.

51. The system according to claim 28, wherein the central application comprises verifying means for verifying if a catalogue of images recorded by a digital video recording unit of each remote station exceeds a predetermined threshold.

52. The combination according to claim 38, wherein said video system components of each remote station comprises at least one sensor generating an audit trail.

53. The combination according to claim 52, wherein the central application comprises an audit trail analyser of at least one sensor of at least one remote station application for generating a subset of said diagnostic instructions.

54. The combination according to claim 53, wherein said audit trail analyser comprises means for determining if said sensor is shorted.

55. The combination according to claim 53, wherein said audit trail analyser comprises means for determining if said sensor is open.

56. The combination according to claim 53, wherein said audit trail analyser comprises means for verifying an activity level of said sensor.

57. The system according to claim 28, wherein said central application further comprises a log of the execution of said script files.

58. The system according to claim 28, wherein the time monitoring means are periodically synchronized with a standard time reference.

* * * * *